(12) United States Patent
Lee

(10) Patent No.: US 6,173,976 B1
(45) Date of Patent: Jan. 16, 2001

(54) FOLDING COLLAPSIBLE KICK SCOOTER

(76) Inventor: Kuo-Lung Lee, No. 61, Mai Jou II Rd., Yi Lan City (TW)

( * ) Notice: Under 35 U.S.C. 154(b), the term of this patent shall be extended for 0 days.

(21) Appl. No.: 09/561,985

(22) Filed: May 2, 2000

(51) Int. Cl.[7] .................................................. B62K 15/00
(52) U.S. Cl. .................................. 280/87.05; 280/87.041
(58) Field of Search ........................ 280/87.021, 87.041, 280/87.05, 220, 11.27

(56) References Cited

U.S. PATENT DOCUMENTS

| | | | |
|---|---|---|---|
| 2,170,978 | * 8/1939 | Smith | 280/87.05 |
| 2,546,711 | * 3/1951 | Amendt | 280/87.05 |
| 5,039,121 | * 8/1991 | Holter | 280/87.021 |
| 5,848,660 | * 12/1998 | McGreen | 280/87.05 |

FOREIGN PATENT DOCUMENTS

| | | | |
|---|---|---|---|
| 596 064 | * 10/1925 | (FR) | 280/87.05 |
| 174175 | * 1/1922 | (GB) | 280/87.05 |
| 217119 | * 6/1924 | (GB) | 280/87.05 |
| 222668 | * 10/1924 | (GB) | 280/87.05 |

* cited by examiner

Primary Examiner—Richard M. Camby
(74) Attorney, Agent, or Firm—Varndell & Varndell, PLLC (57) ABSTRACT

A folding collapsible kick scooter is made to include a base frame supported on a rear wheel a handlebar and front fork assembly supported on a front wheel, a connecting bar having one end fixedly connected to the handlebar and front fork assembly and a rear end pivotally connected between two arched upright lugs at the base frame by a pivot for enabling the handlebar and front fork assembly to be turned with the connecting bar relative to the base frame between an extended position and a collapsed position, and a quick-release lock installed in the lugs and the connecting bar and controlled to lock the handlebar and front fork assembly and the connecting bar, the quick-release lock formed of a locking lever, a holding-down block, a shaft inserted through an arched slot on each lug, and a cap nut, wherein the shaft has a flat rear end moved with the locking lever between two expanded ends of an arched slot on one lug and forced into engagement with two protruded portions in one expanded end of the arched slot upon a 90° rotary motion of the shaft with the locking lever.

2 Claims, 15 Drawing Sheets

FOLDING COLLAPSIBLE KICK SCOOTER

BACKGROUND AND SUMMARY OF THE INVENTION

The present invention relates to a kick scooter, and more particularly to a folding collapsible kick scooter.

Figures from 1 through 4 show a folding collapsible kick scooter according to the prior art. According to this design, the folding collapsible kick scooter comprises a folding collapsible coupling structure connected between the handlebar and front fork assembly 92, which is supported on a front wheel, and the base frame, which is supported on a rear wheel. The coupling structure comprises a bracket 95 fixedly fastened to the handlebar and front fork assembly 92, and a coupling frame 93 fixedly mounted on a front side of the base frame and coupled to the bracket 95. The coupling frame 93 comprises two smoothly arched sliding slots 931 respectively formed on two opposite lateral side walls thereof, and two retaining holes 932 at two distal ends of each sliding slot 931. The bracket 95 has two bottom pivot holes 952 pivotally coupled to the coupling frame 93 by a pivot 96, and two upper coupling holes 951 coupled between the arched sliding slots 931 on the two opposite lateral side walls of the coupling frame 93 by a shaft 97. The shaft 97 is inserted through the arched sliding slots 931 on the two opposite lateral side walls of the coupling frame 93, and moved with the bracket 95 between the two retaining holes 932 at two distal ends of each arched sliding slot 931. A spring member 90 connected between the pivot 96 and the shaft 97 to pull the shaft 97 downwards. Further, a control handle 98 is mounted on the bracket 95, having a hook 981 hooked on the shaft 97. The control handle 98 is turned between a first position where the shaft 97 is lifted and disengaged from the retaining hole 932 at one end of the arched sliding slot 931 on each lateral side wall of the coupling frame 93 for enabling the folding collapsible kick scooter to be collapsed, and a second position where the shaft 97 is released from the hook 981 and pulled downwards by the spring member 90 into engagement with one retaining hole 932 at one end of the arched sliding slot 931 on each lateral side wall of the coupling frame 93. This coupling structure is complicated, and its manufacturing cost is high. Further, the shaft 97 tends to be forced out of the retaining hole 932 at one end of the arched sliding slot 931 on each lateral side wall of the coupling frame 93 by an external force, causing the folding collapsible kick scooter to be suddenly collapsed.

The present invention provides a folding collapsible kick scooter, which eliminates the aforesaid drawbacks. According to one aspect of the present invention, the folding collapsible kick scooter comprises a base frame supported on a rear wheel a handlebar and front fork assembly supported on a front wheel, a connecting bar having one end fixedly connected to the handlebar and front fork assembly and a rear end pivotally connected between two arched upright lugs at the base frame by a pivot for enabling the handlebar and front fork assembly to be turned with the connecting bar relative to the base frame between an extended position and a collapsed position, and a quick-release lock installed in the lugs and the connecting bar and controlled to lock the handlebar and front fork assembly and the connecting bar. The quick-release lock is comprised of a locking lever, a holding-down block, a shaft inserted through an arched slot on each lug, and a cap nut. The shaft has a flat rear end moved with the locking lever between two expanded ends of an arched slot on one lug, and forced into engagement with two protruded portions in one expanded end of the arched slot upon a 90° rotary motion of the shaft with the locking lever. The flat rear end of the shaft is disengaged from the protruded portions in one expanded end of the arched slot when rotating the shaft with the locking lever through 90° in the reversed direction. According to another aspect of the present invention, the handlebar and front fork assembly comprises a vertical handlebar stem, and a folding collapsible handlebar connected to a top end of the vertical handlebar stem. The folding collapsible handlebar comprises an outer sleeve fixedly connected to the handlebar stem, two tubular hand grips respectively pivoted to two distal ends of the outer sleeve, and lock means for locking tubular hand grips in the operative position.

DETAILED DESCRIPTION OF THE PREFERRED EMBODIMENT

Referring to Figures from 5 through 16, a folding collapsible kick scooter is shown comprised of a base frame 1, a handlebar and front fork assembly 2, a front wheel 3, a rear wheel 4, and a connecting bar 5. The handlebar and front form assembly 2 is supported on the front wheel 3, comprising a folding collapsible handlebar 21 for steering control. The connecting bar 5 has a front end fixedly connected to the handlebar and front fork assembly 2, and a rear end pivotally connected between two arched upright lugs 11 at a front side of the base frame 1 by a pivot 51 for enabling the handlebar and front fork assembly 2 to be turned with the connecting bar 5 relative to the base frame 1 between the operative (extended) position and the non-operative (collapsed) position. The rear wheel 4 is mounted on a rear side of the base frame 1. A quick-release lock 6 is installed in the lugs 11 at the base frame 1 and the rear end of the connecting bar 5, and controlled to lock the handlebar and front fork assembly 2 and the connecting bar 5 in the operative (extended) or non-operative (collapsed) position. The quick-release lock 6 is comprised of a locking lever 61, a holding-down block 62, a shaft 63, a cap nut 64, and a pivot 65. The shaft 63 has one end 631 inserted through a through hole 621 on the holding-down block 62 and connected to the locking lever 61 by the pivot 65, and the other end threaded 632 and inserted through an arched slot 111 on each lug 11 and a through hole (not shown) on the connecting bar 5 and then screwed up with the cap nut 64.

Figure 1:
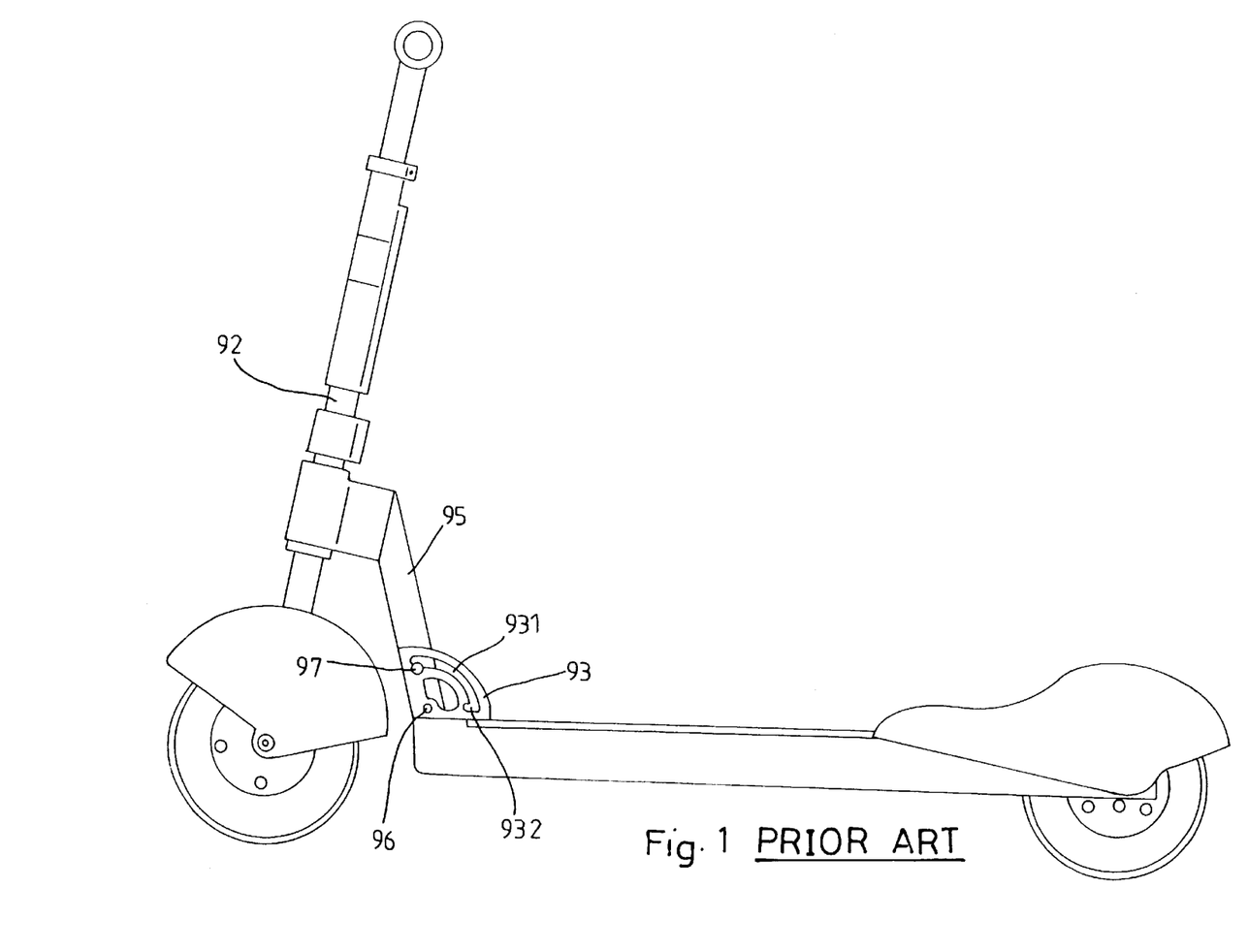
FIG. 1 is a side plain view of a folding collapsible kick scooter according to the prior art.
Figure 2:
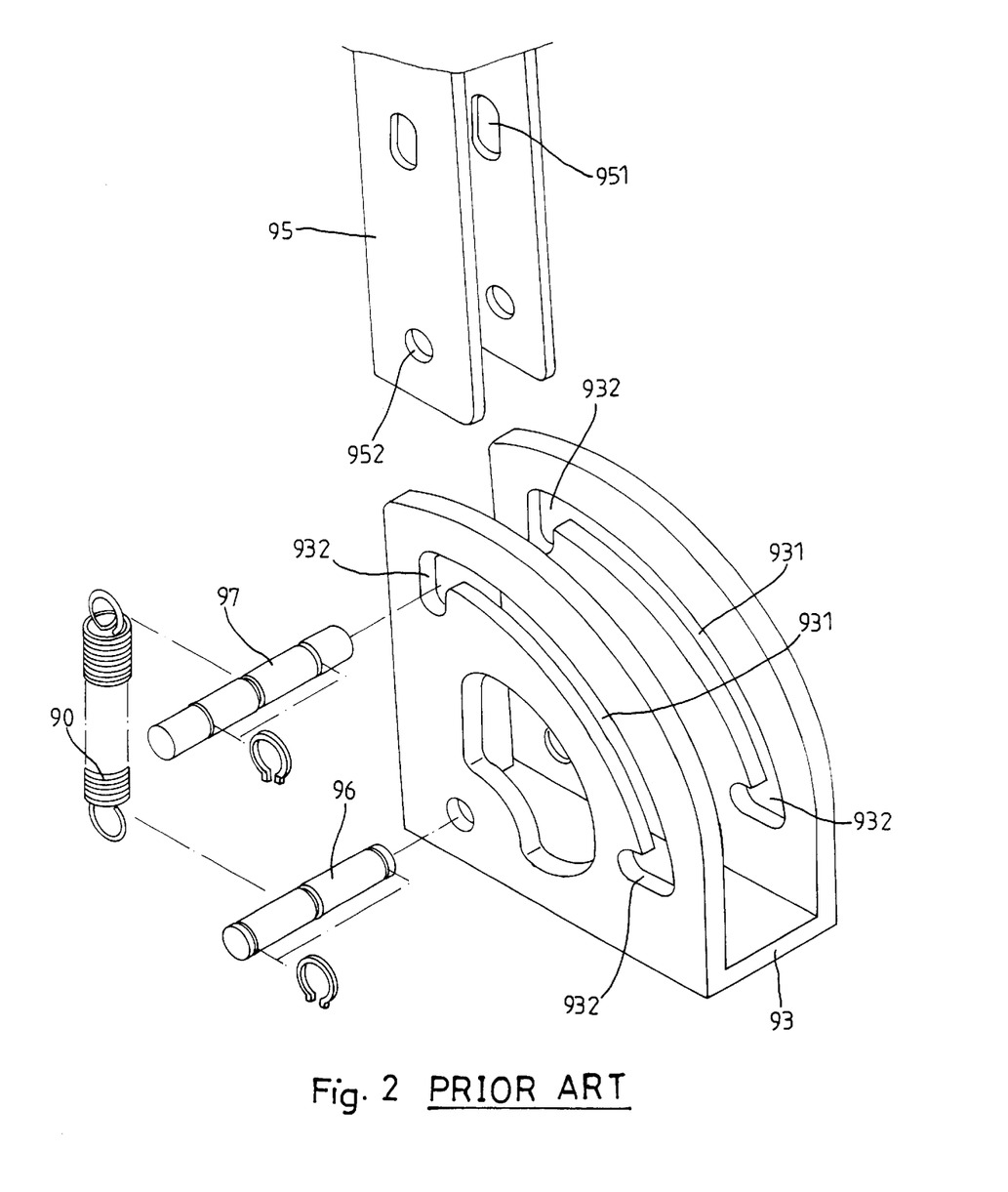
FIG. 2 is an exploded view in an enlarged scale of a part of FIG. 1 showing the coupling structure between the bracket and the base frame.
Figure 3:
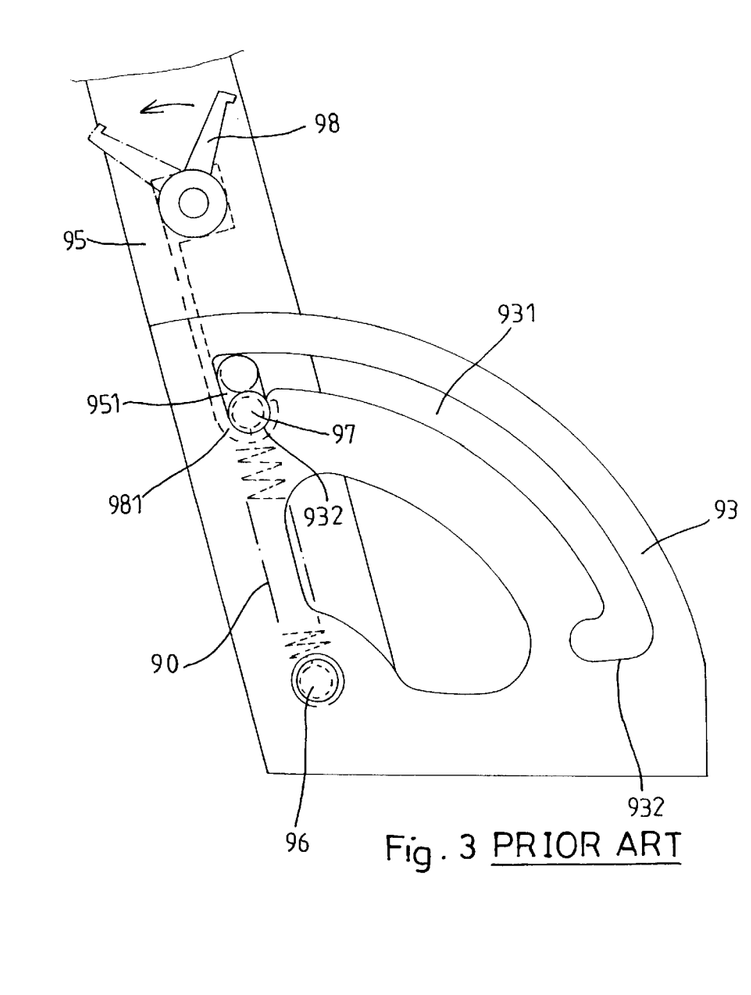
FIG. 3 is a plain view showing the coupling structure of the prior art folding collapsible kick scooter assembled.
Figure 4:
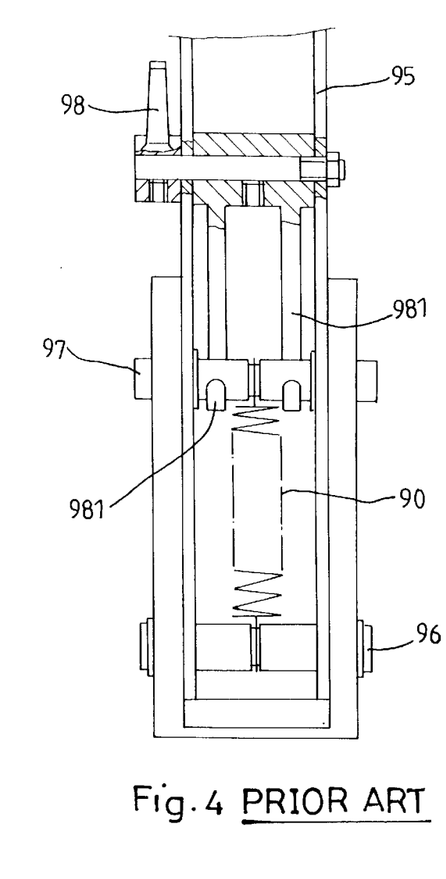
FIG. 4 is a sectional view of the assembly shown in FIG. 3.
Figure 5:
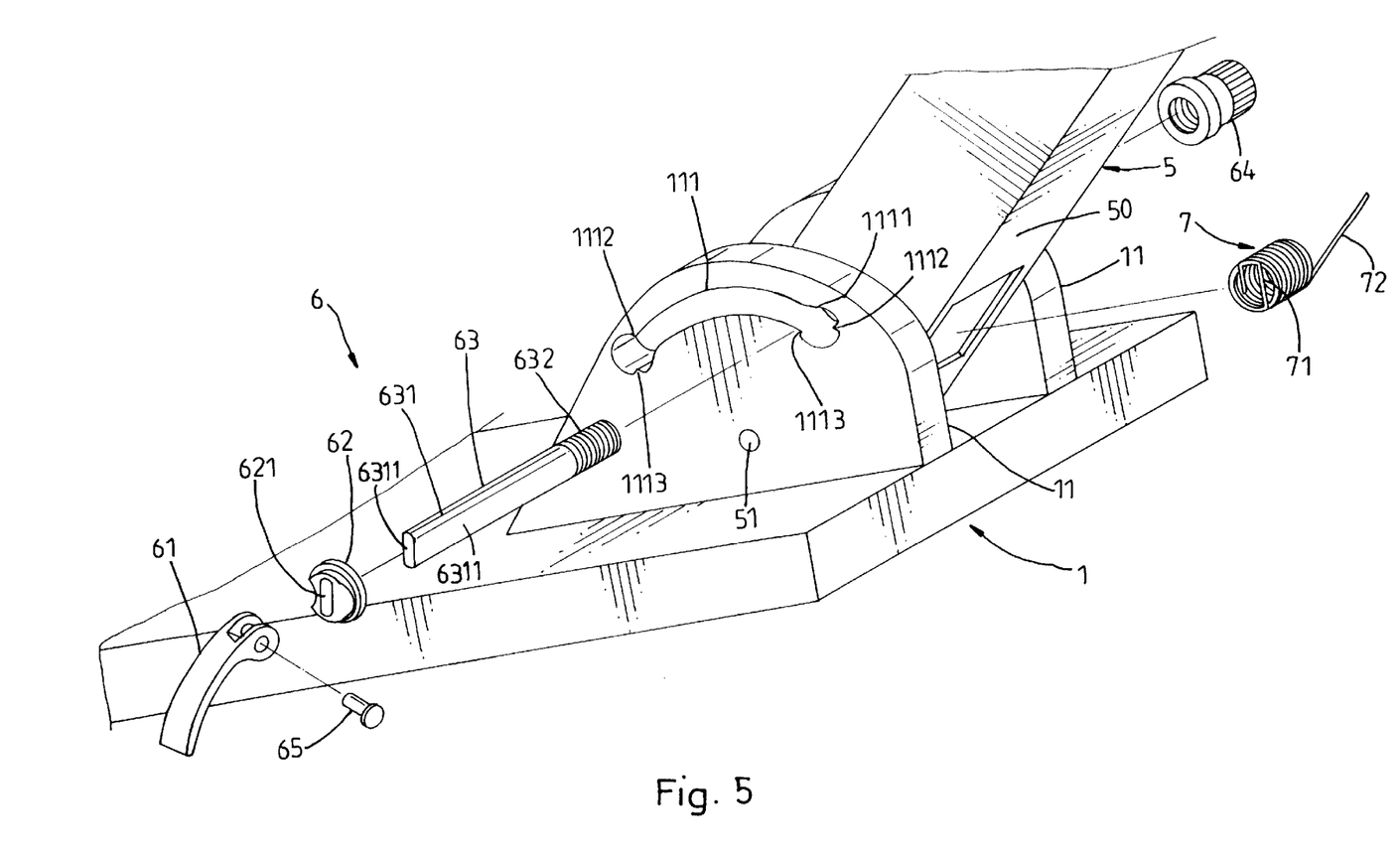
FIG. 5 is an exploded view of the coupling structure between the connecting bar and the base frame for a folding collapsible kick scooter according to the present invention.
Figure 6:
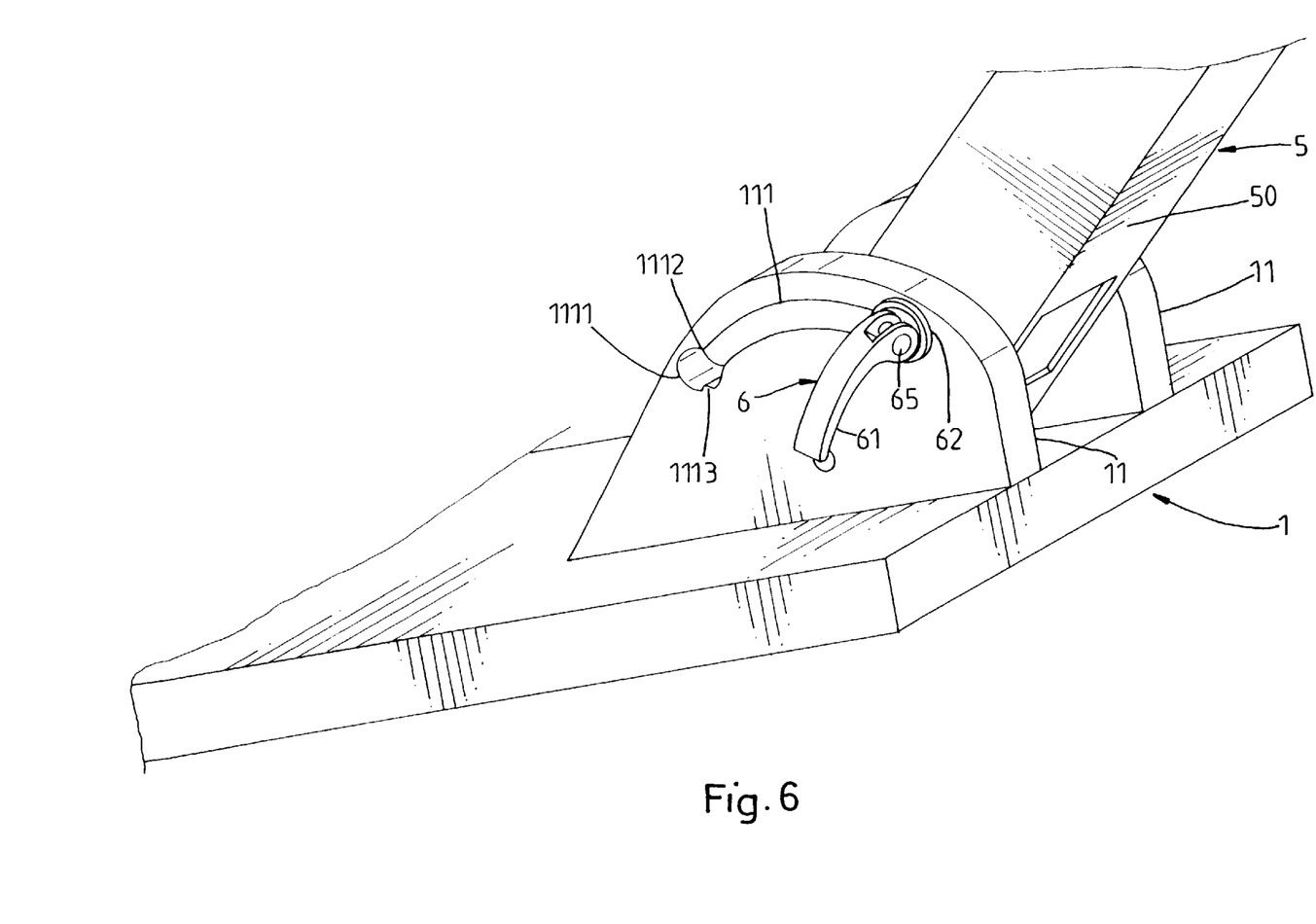
FIG. 6 is an assembly view of FIG. 5.
Figure 7:
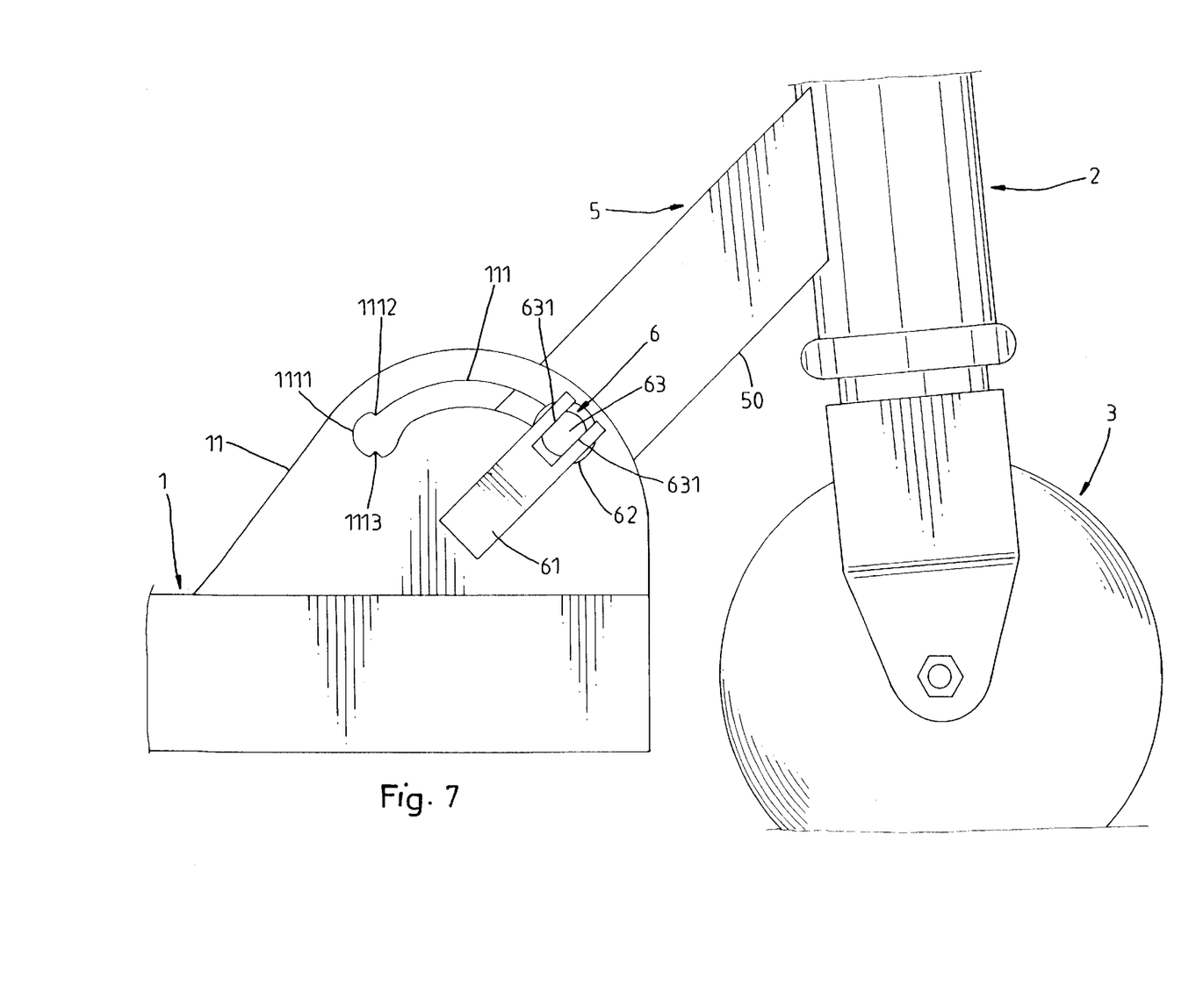
FIG. 7 is side view of a part of the present invention, showing the handlebar and front fork assembly and the connecting bar locked in the extended position.
Figure 8:
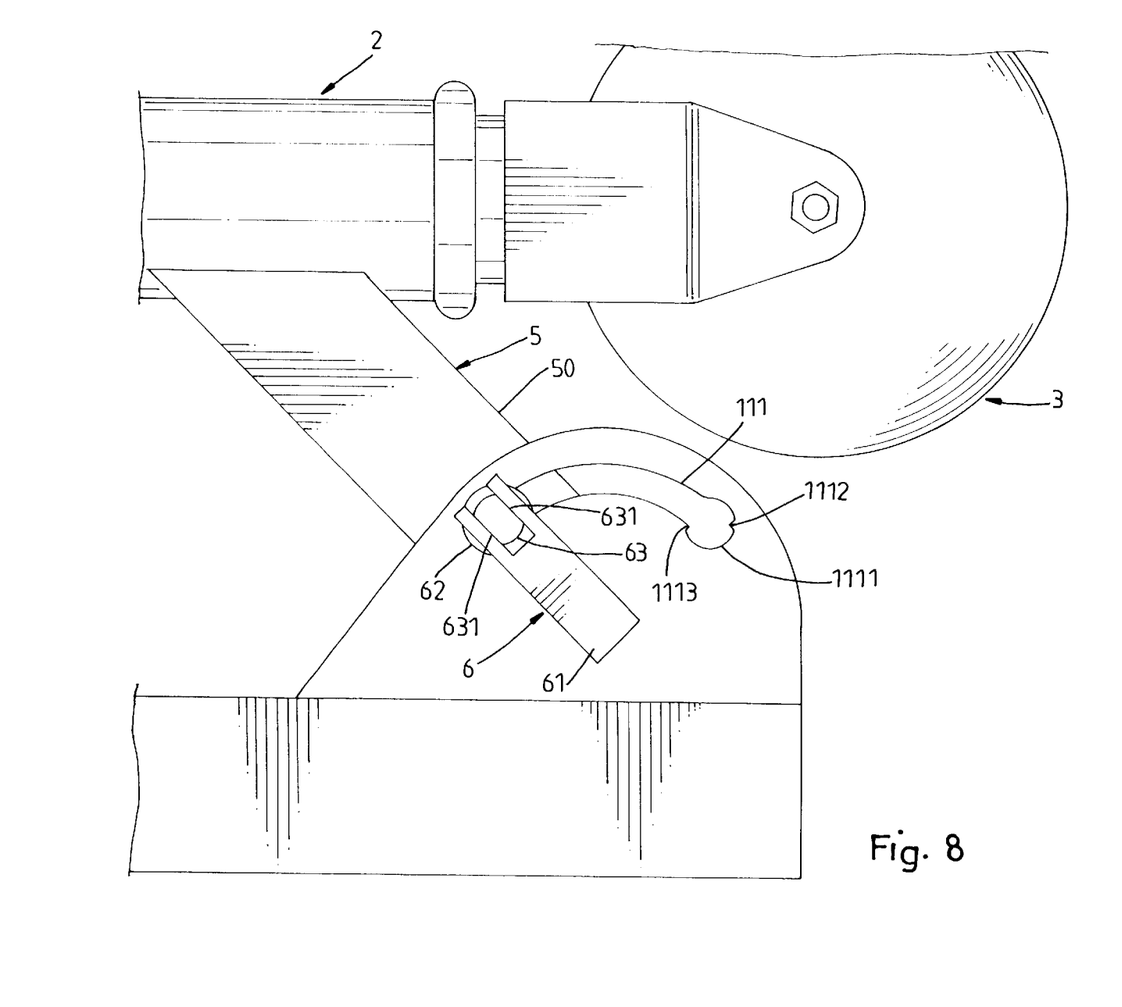
FIG. 8 is a side view of a part of the present invention, showing the handlebar and front fork assembly and the connecting bar locked in the collapsed position.
Figure 9:
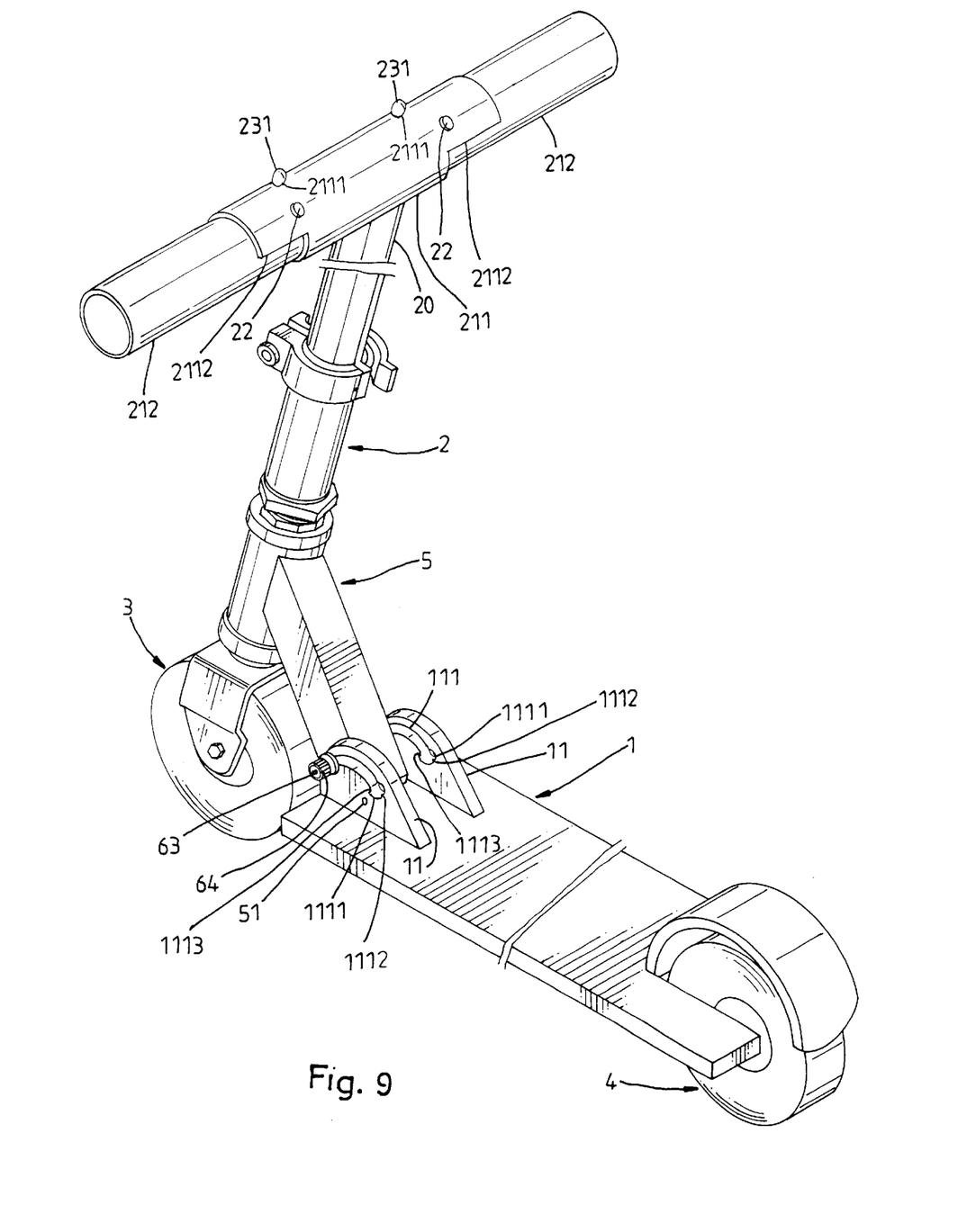
FIG. 9 is an elevational view of a folding collapsible kick scooter according to the present invention.
Figure 10:
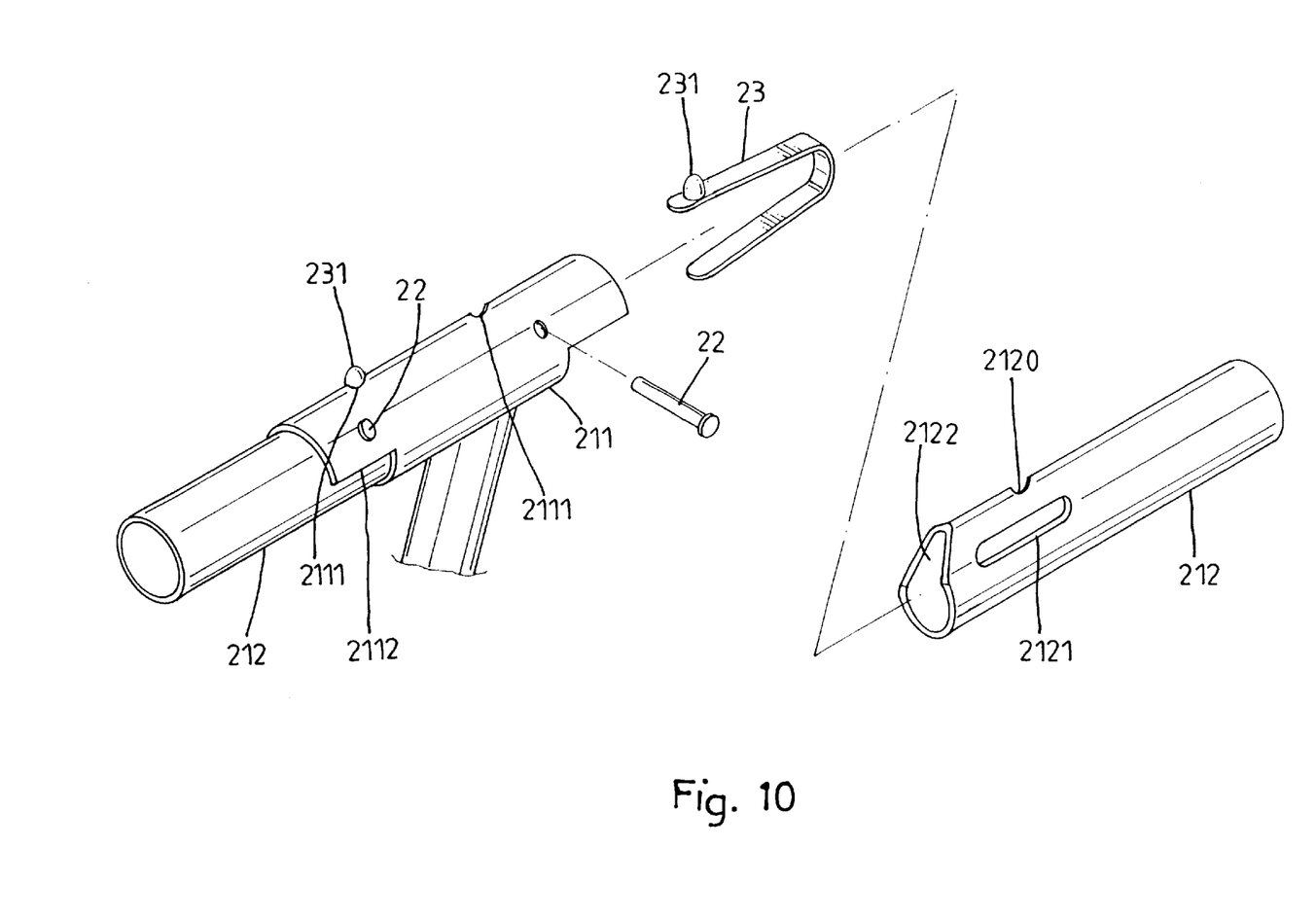
FIG. 10 is an exploded view of the folding collapsible handlebar for the handlebar and front fork assembly according to the present invention.
Figure 11:
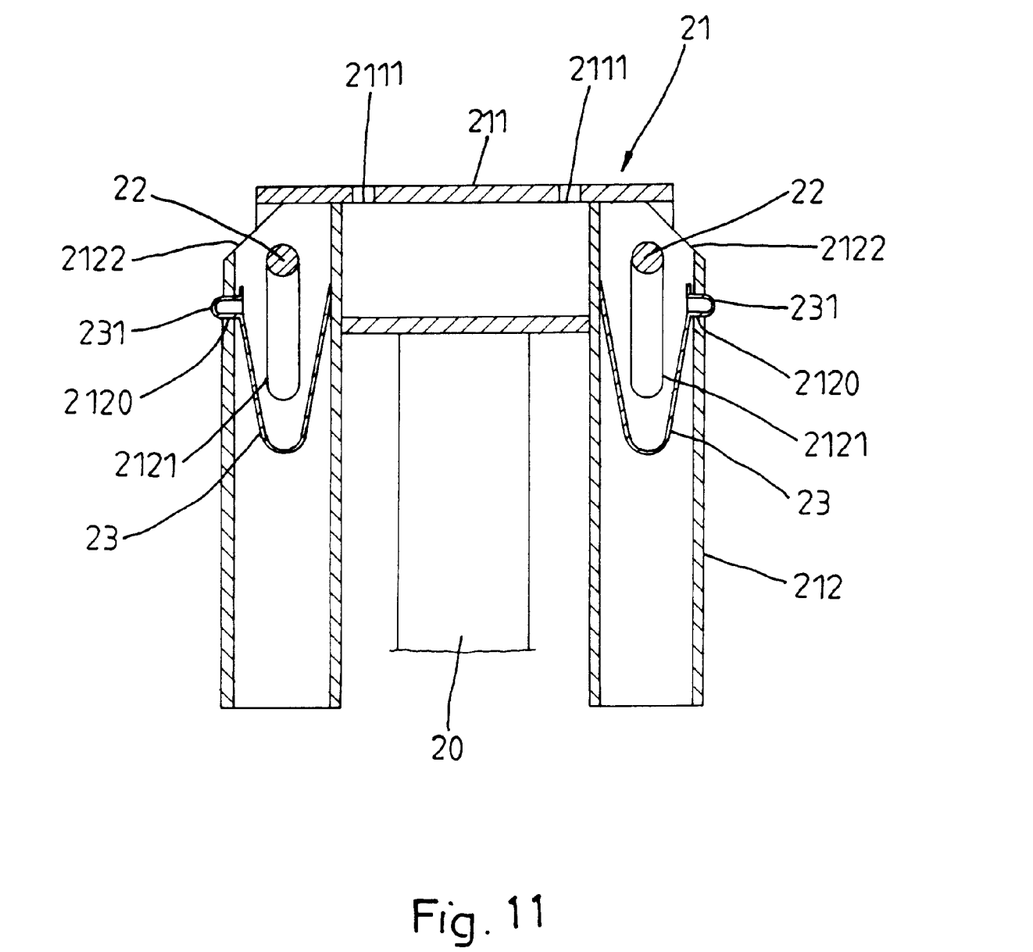
FIG. 11 is a sectional view showing the folding collapsible handlebar collapsed according to the present invention.
Figure 12:
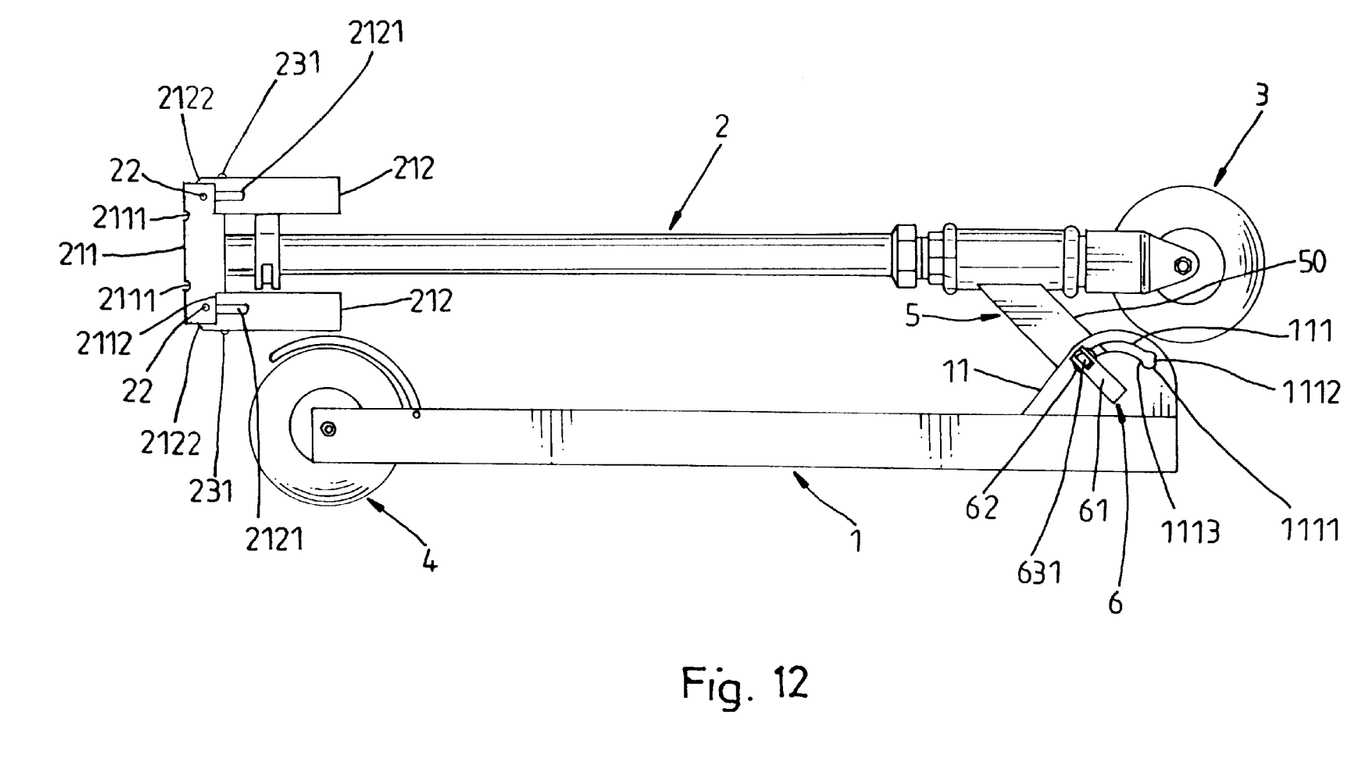
FIG. 12 illustrates the folding collapsible kick scooter collapsed according to the present invention.
Figure 13:
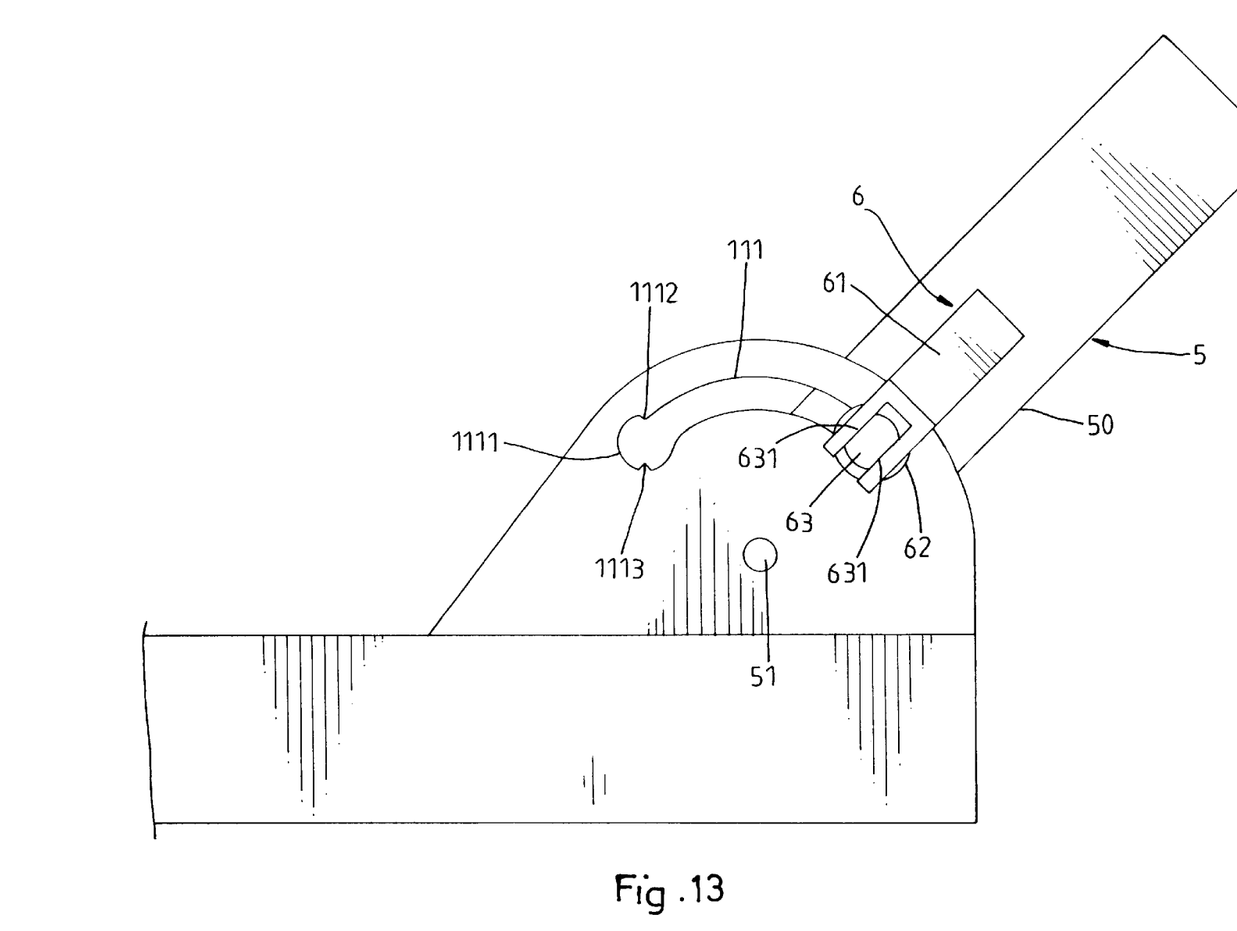
FIG. 13 is a side view of a part of the present invention, showing the locking lever turned outwards.
Figure 14:
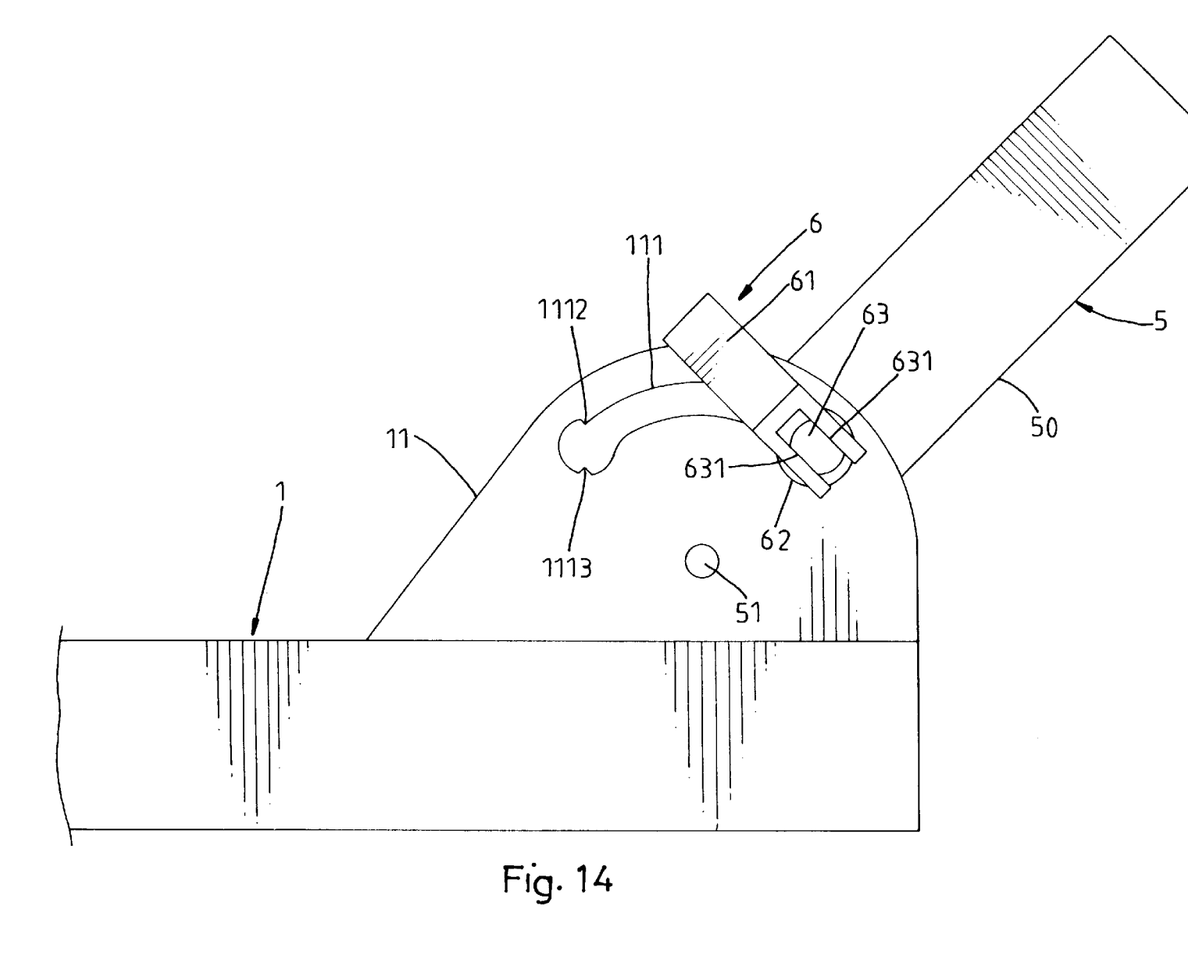
FIG. 14 is similar to FIG. 13 but shoving the locking lever rotated through 90°.
Figure 15:
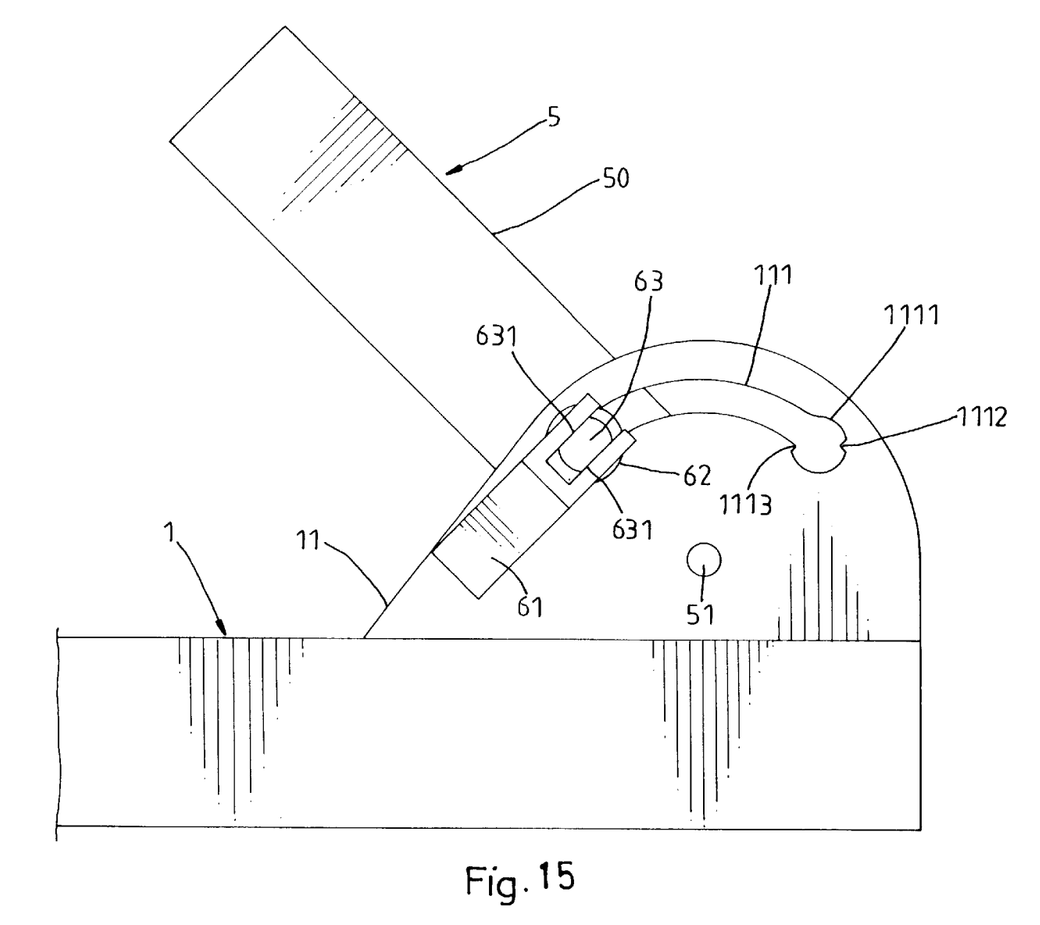
FIG. 15 is similar to FIG. 14 but showing the shaft shifted with the locking lever from one expanded end of the arched slot on one lug to the other expanded end.
Figure 16:
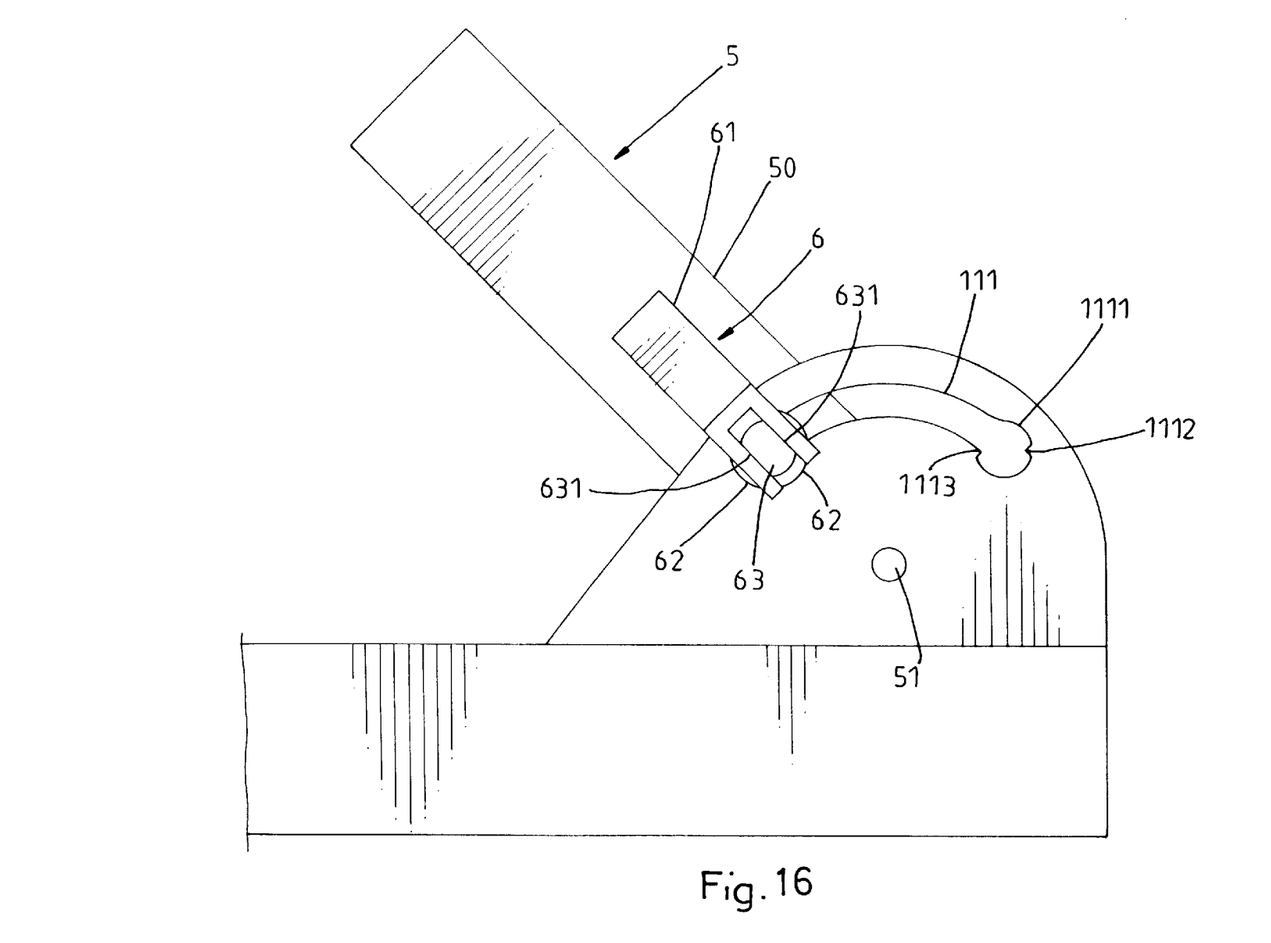
FIG. 16 is similar to FIG. 15 but showing the locking lever rotated through 90° in the reversed direction.

The rear end 631 of the shaft 63 is a flat end of oblong cross section, having two opposite flat side walls 6311. The through hole 621 of the holding-down block 62 is an oblong through hole fitting the cross section of the rear end 631 of the shaft 63. The connecting bar 5 is a tubular member. A torsional spring 7 is mounted on the shaft 63 inside the tubular connecting bar 5, having a first end 71 fastened to the flat rear end 631 of the shaft 63 and a second end 72 secured to the peripheral wall 50 of the connecting bar 5. The arched slot 111 on each lug 11 has two expanded ends 1111, and two protruded portions 1112 and 1113 in each expanded end 1111 for engagement with the two opposite flat side walls 6311 of the rear end 631 of the shaft 63.

Referring to Figures from 13 through 16 and FIGS. 7 and 8 again, when the handlebar and front fork assembly 2 is turned with the connecting bar 5 relative to the base frame 1 to the operative (extended) position or non-operative (collapsed) position, the two opposite flat side walls 6311 of the rear end 631 of the shaft 63 are forced into engagement with the two protruded portions 1112 and 1113 in one espanded end 1111 of the arched slot 111 on one lug 11, and then the locking lever 61 is turned inwards to lock the shaft 63 in position. On the contrary, when unlocking the shaft 63 for enabling the folding collapsible kick scooter to be moved from the extended (or collapsed) position to the collapsed (or extended position), the locking lever 61 is turned outwards (see FIGS. 13 and 15) and then rotated through 90° (see FIGS. 14 and 16) to disengage the two opposite flat side walls 6311 of the rear end 631 of the shaft 63 from the two protruded portions 1112 and 1113 in the corresponding expanded end 1111 of the arched slot 111 on one lug 11, enabling the shaft 63 to be shifted from one expanded end 1111 of the arched slot 111 on each lug 11 to the other expanded end 1111 of the arched slot 111 on each lug 11. After having been shifted from one expanded end 1111 of the arched slot 111 on each lug 11 to the other expanded end 1111 of the arched slot 111 on each lug 11, the shaft 63 is rotated with the locking lever 61 through 90° to force the two opposite flat side walls 6311 of the rear end 631 of the shaft 63 into engagement with the two protruded portions 1112 and 1113 in the corresponding expanded end 1111 of the arched slot 111 on one lug 11, and then the locking lever 61 is turned inwards to lock the folding collapsible kick scooter in the collapsed (or extended) position.

Referring to Figures from 9 through 12, the handlebar and front fork assembly 2 comprises a vertical handlebar stem 20, and a horizontal folding collapsible handlebar 21 connected to the top end of the vertical handlebar stem 20. The folding collapsible handlebar 21 comprises an outer sleeve 211 fixedly connected to the top end of the handlebar stem 20, and two tubular hand grips 212 respectively pivoted to two distal ends of the outer sleeve 211. The outer sleeve 211 comprises two retaining holes 2111 disposed at the top side near the two distal ends thereof, and two bottom notches 2112 respectively formed on the two distal ends thereof at the bottom side. The tubular hand grips 212 each have a curved end edge 2122, a radial top through hole 2120, and an oblong slot 2121 disposed near the curved end edge 2122. Two rivets 22 are respectively inserted through the oblong slot 2121 of the tubular handgrips 212 and fastened to the two distal ends of the outer sleeve 211. Further, two retaining spring elements 23 are respectively mounted in the tubular hand grips 212, each having a raised portion 231 extended out of the radial top through hole 2120 on one tubular hand grip 212 for engaging into one retaining hole 2111 on the outer sleeve 211. The design of the bottom notches 2112 at the outer sleeve 211 and the curved end edge 2122 at each tubular hand grip 212 enable the tubular hand grips 212 to be smoothly turned about the respective rivets 22 between tge extended position (see FIG. 9) and the collapsed position (see FIGS. 11 and 12). When collapsing the folding collapsible handlebar 21, the raised portion 231 of each retaining spring element 23 is forced inwards and disengaged from the corresponding retaining hole 2111 on the outer sleeve 211, and then the tubular hand grips 212 are respectively axially pulled outwards from the outer sleeve 211 and then turned downwards. When returning the folding collapsible handlebar 21 from the collapsed position to the extended position, the aforesaid procedure is repeated reversely.

What is claimed is:

1. A folding collapsible kick scooter comprising a front wheel, a rear wheel, a handlebar and front fork assembly supported on said front wheel, a base frame, said base frame having two arched upright lugs at a front side thereof and a rear side supported on said rear wheel, said arched upright lugs each having an arched slot, a connecting bar, said connecting bar having a front end fixedly connected to said handlebar and front fork assembly and a rear end pivotally connected between the two arched upright lugs at said base frame by a pivot for enabling said handlebar and front fork assembly to be turned with said connecting bar relative to said base frame between an extended position and a collapsed position, and a quick-release lock installed in the lugs at said base frame and the rear end of said connecting bar and controlled to lock said handlebar and front fork assembly and said connecting bar, said quick-release lock comprised of a locking lever, a holding-down block a shaft, and a cap nut, said shaft having one end inserted through a through hole on said holding-down block and pivotally connected to said locking lever by pivot means, and an opposite end threaded and inserted through the arched slot on each lug at said base frame and a through hole on said connecting bar and then screwed up with said cap nut, wherein:

the rear end of said shaft is a flat end of oblong cross section, having two opposite flat side walls, the through hole of said holding-down block is an oblong through hole fitting the cross section of the rear end of said shaft; said connecting bar is a tubular member holding a torisonal spring on the inside around said shaft, said torsional spring having a first end fastened to the flat rear end of said shaft and a second end secured to the peripheral wall of said connecting bar; the arched slot on each lug of said base frame has two expanded ends, the expanded ends of the arched slot on one lug of said base frame each having two vertically spaced protruded portions for engagement with the two opposite flat side walls of the rear end of said shaft upon a 90° rotary motion of said shaft with said locking lever after the rear end of said shaft has been moved to the expanded end at one end of the arched slot on one lug of said base frame.

2. The folding collapsible kick scooter of claim 1 wherein said handlebar and front fork assembly comprises a vertical handlebar stem, and a folding collapsible handlebar connected to a top end of said vertical handlebar stem, said folding collapsible handlebar comprising an outer sleeve fixedly connected to said handlebar stem, two tubular hand grips respectively pivoted to two distal ends of said outer sleeve, and two retaining spring elements mounted in said tubular hand grips for locking said tubular hand grips, said outer sleeve comprising two retaining holes disposed at a top side thereof, and two bottom notches respectively formed on two distal ends of a bottom side thereof, said tubular hand grips each having a curved end edge inserted into said outer sleeve, a radial top through hole, and an oblong slot disposed near said curved end edge and coupled to said outer sleeve by a rivet, said retaining spring elements each having a raised portion extended out of the radial top through hole on one tubular hand grip for engaging into one retaining hole on said outer sleeve.

* * * * *